US010602054B2

(12) United States Patent
Jung et al.

(10) Patent No.: US 10,602,054 B2
(45) Date of Patent: Mar. 24, 2020

(54) VIDEO CAPTURE WITH PRIVACY SAFEGUARD

(71) Applicant: Microsoft Technology Licensing, LLC, Redmond, WA (US)

(72) Inventors: Jaeyeon Jung, Kirkland, WA (US); Matthai Philipose, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 191 days.

(21) Appl. No.: 14/593,839

(22) Filed: Jan. 9, 2015

(65) Prior Publication Data

US 2016/0080642 A1    Mar. 17, 2016

Related U.S. Application Data

(60) Provisional application No. 62/049,943, filed on Sep. 12, 2014.

(51) Int. Cl.
*H04N 5/232* (2006.01)
*G06K 9/20* (2006.01)
(Continued)

(52) U.S. Cl.
CPC ..... *H04N 5/23219* (2013.01); *G06K 9/00355* (2013.01); *G06K 9/00671* (2013.01); *G06K 9/00718* (2013.01); *G06K 9/2018* (2013.01); *G11B 19/02* (2013.01); *H04N 5/2258* (2013.01); *H04N 5/772* (2013.01); *G06K 9/00771* (2013.01); *G06K 2009/00738* (2013.01)

(58) Field of Classification Search
CPC ..... G06K 2009/00738; G06K 9/00355; G06K 9/00671; G06K 9/00718; G06K 9/00771; G06K 9/2018; G11B 19/02; H04N 5/23219; H04N 5/772
USPC ......................................................... 386/227
See application file for complete search history.

(56) References Cited

U.S. PATENT DOCUMENTS 7,817,914 B2    10/2010  Kuberka et al.
8,780,205 B2    7/2014   Boutell et al.
(Continued)

FOREIGN PATENT DOCUMENTS

CN    101127834 A    2/2008
CN    101667235 A    3/2010
(Continued)

OTHER PUBLICATIONS

Templeman, et al., "PlaceAvoider: Steering First-Person Cameras away from Sensitive Spaces", in Proceedings of the 21st Annual Network & Distributed System Security Symposium, Feb. 23, 2014, 15 pages.

(Continued)

*Primary Examiner* — Gelek W Topgyal
(74) *Attorney, Agent, or Firm* — Alleman Hall Creasman & Tuttle LLP

(57) ABSTRACT

A method to record video with a video camera while respecting bystander privacy includes acquiring sensory data separate from the video, parsing the sensory data for evidence of a human being in a field of view of the video camera, and recording video with the video camera if no human being is detected in the field of view, based upon the sensory data.

20 Claims, 5 Drawing Sheets

(51) Int. Cl.
  *G06K 9/00* (2006.01)
  *G11B 19/02* (2006.01)
  *H04N 5/76* (2006.01)
  *H04N 5/225* (2006.01)
  *H04N 5/77* (2006.01)

(56) References Cited

U.S. PATENT DOCUMENTS

| | | | | |
|---|---|---|---|---|
| 9,179,105 | B1* | 11/2015 | Zeira | H04N 5/2254 |
| 2001/0015409 | A1* | 8/2001 | Mahler | G08B 13/19697 |
| | | | | 250/342 |
| 2004/0202382 | A1 | 10/2004 | Pilu | |
| 2004/0233282 | A1* | 11/2004 | Stavely | G08B 13/19602 |
| | | | | 348/143 |
| 2005/0163466 | A1* | 7/2005 | Liebhold | G11B 19/022 |
| | | | | 386/230 |
| 2006/0258376 | A1 | 11/2006 | Ewell, Jr. | |
| 2007/0237358 | A1* | 10/2007 | Tseng | G08B 13/19608 |
| | | | | 382/103 |
| 2010/0323608 | A1 | 12/2010 | Sanhedrai et al. | |
| 2012/0277914 | A1* | 11/2012 | Crow | G05D 1/0094 |
| | | | | 700/259 |
| 2013/0155255 | A1* | 6/2013 | Yu | H04N 5/23203 |
| | | | | 348/164 |
| 2013/0229528 | A1 | 9/2013 | Taylor et al. | |
| 2016/0234916 | A1* | 8/2016 | Mans | H05B 37/0227 |

FOREIGN PATENT DOCUMENTS

| | | |
|---|---|---|
| CN | 102681652 A | 9/2012 |
| CN | 103167230 A | 6/2013 |
| CN | 103957103 A | 7/2014 |

OTHER PUBLICATIONS

Truong, et al., "Preventing Camera Recording by Designing a Capture-Resistant Environment", in Proceedings of the 7th International Conference on Ubiquitous Computing, Sep. 11, 2005, 14 pages.
Greenberg, Andy, "Cut off Glassholes' Wi-Fi with this Google Glass Detector", Published on: Mar. 6, 2014 Available at: http://www.wired.com/2014/06/find-and-ban-glassholes-with-this-artists-google-glass-detector/.
"Autographer", Retrieved on: Sep. 9, 2014 Available at: http://www.autographer.com.
"Google Glass", Retrieved on: Sep. 9, 2014 http://www.google.com/glass/start/.
Reddy, et al., "Image Browsing, Processing, and Clustering for Participatory Sensing: Lessons from a DietSense Prototype", in Proceedings of the 4th Workshop on Embedded Networked Sensors, Jun. 25, 2007, 5 pages.
Denning, et al., "In Situ with Bystanders of Augmented Reality Glasses: Perspectives on Recording and Privacy-Mediating Technologies", in Proceedings of the SIGCHI Conference on Human Factors in Computing Systems, Apr. 26, 2014, 10 pages.
Brocker, et al., "iSeeYou: Disabling the MacBook Webcam Indicator LED", in Proceedings of 23rd USENIX Security Symposium, Aug. 20, 2014, 13 pages.
Banks, David, "Improving the Wearable", Published on: Jun. 22, 2014 Available at: http://thesocietypages.org/cyborgology/2014/06/22/improving-the-wearable/.
Dickie, et al., "Augmenting and Sharing Memory with eyeBlog", in Proceedings of the First ACM Workshop on Continous Archival and Retrieval of Personal Experiences, Oct. 15, 2004, 5 pages.
Love, Dylan, "This Apple Patent Will Shut Down Your Camera at Live Concerts", Published on: Jun. 16, 2011 Available at: http://www.businessinsider.com/iphone-concert-patent-2011-6?IR=T.
Galin, Val, "Neurocam Reads Your Brain to Automatically Record Videos", Published on: Nov. 5, 2013 Available at: http://www.togtech.com/neurocam-reads-brain-automatically-record-videos/.
Roesner, et al., "Security and Privacy for Augmented Reality Systems", in Communications of the ACM, vol. 57, No. 4, Apr. 2014, 7 pages.
Barhm, M. et al., "Negotiating Privacy Preferences in Video Surveillance Systems," 24th International Conference on Industrial Engineering and Other Applications of Applied Intelligent Systems Conference on Modern Approaches in Applied Intelligence (IEA/AIE 2011), Part II, Jun. 28, 2011, Syracuse, NY, 11 pages.
Roesner, F. et al., "World-Driven Access Control for Continuous Sensing," Microsoft Research Tech Report MSR-TR-2014-67, Available Online at http://research.microsoft.com/pubs/217301/wdac.pdf, May 19, 2014, 12 pages.
Han, S. et al., "GlimpseData: Towards Continuous Vision-Based Personal Analytics," 2014 Workshop on Physical Analytics (WPA '14), Jun. 11, 2014, Bretton Woods, NH, 6 pages.
"Thermographic Camera," Wikipedia Entry, Available Online at https://en.wikipedia.org/wiki/Thermographic_camera, Jul. 10, 2014, 8 pages.
Ashok, A. et al., "Do not share! Invisible Light Beacons for Signaling Preferences to Privacy-Respecting Cameras," 1st ACM MobiCom Workshop on Visible Light Communication Systems (VLCS '14), Sep. 7, 2014, Maui, HI, 6 pages.
ISA European Patent Office, International Search Report and Written Opinion Issued in Application No. PCT/US2015/049055, dated Dec. 16, 2015, WIPO, 11 Pages.
IPEA European Patent Office, International Preliminary Report on Patentability issued in PCT Application No. PCT/US2015/049055, dated Dec. 6, 2016, WIPO, 7 pages.
IPEA European Patent Office, Second Written Opinion Issued in PCT Application No. PCT/US2015/049055, dated Aug. 22, 2016, WIPO, 4 pages.
"Office Action Issued in Chinese Patent Application No. 201580048995.1", dated Oct. 9, 2019, 16 Pages.

* cited by examiner

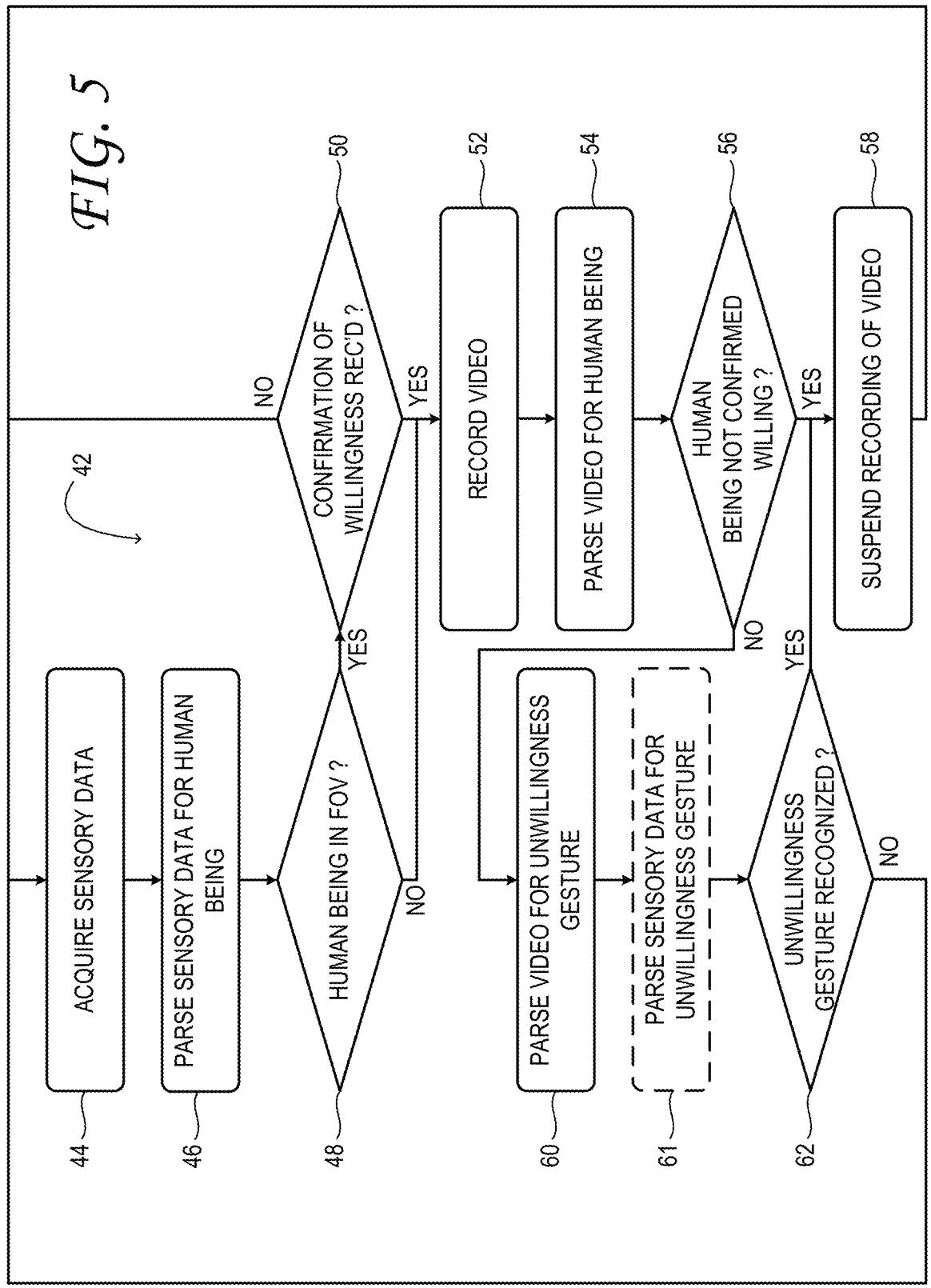

VIDEO CAPTURE WITH PRIVACY SAFEGUARD

CROSS REFERENCE TO RELATED APPLICATIONS

This application claims priority to U.S. Provisional Patent Application No. 62/049,943, filed Sep. 12, 2014, and entitled "VIDEO CAPTURE WITH PRIVACY SAFEGUARD", the entirety of which is hereby incorporated herein by reference.

BACKGROUND

Video-recording technology is increasingly ubiquitous in the world today. Portable electronic devices such as cellular telephones, tablet computers, near-eye displays, and hand-held game systems, for example, may include cameras and associated software to enable video capture.

SUMMARY

In one example, a method to record video with a video camera while respecting bystander privacy is provided. The method includes acquiring sensory data separate from the video, parsing the sensory data for evidence of a human being in a field of view of the video camera, and recording video with the video camera if no human being is detected in the field of view based upon the sensory data.

This Summary is provided to introduce a selection of concepts in simplified form that are further described below in the detailed description. This Summary is not intended to identify key features or essential features of the claimed subject matter, nor is it intended to limit the scope of the claimed subject matter. Furthermore, the claimed subject matter is not limited to implementations that solve any disadvantage noted in any part of this disclosure.

BRIEF DESCRIPTION OF THE DRAWINGS

in FIG. 4, the bystander is making a hand gesture.

FIG. 5 illustrates an example method to record video with a video camera while respecting bystander privacy, in accordance with an embodiment of this disclosure.

DETAILED DESCRIPTION

In cases where a portable electronic device is wearable, video may be captured automatically and/or continuously. This feature enables the device wearer to accumulate a video record of his or her daily activities and later review the record for subjects of particular interest. Though continuous or automatic video recording on a portable device may provide benefit for the device operator, bystanders may not wish to be included in images recorded by the device. Accordingly, examples are disclosed herein that may address such issues.

Figure 1:
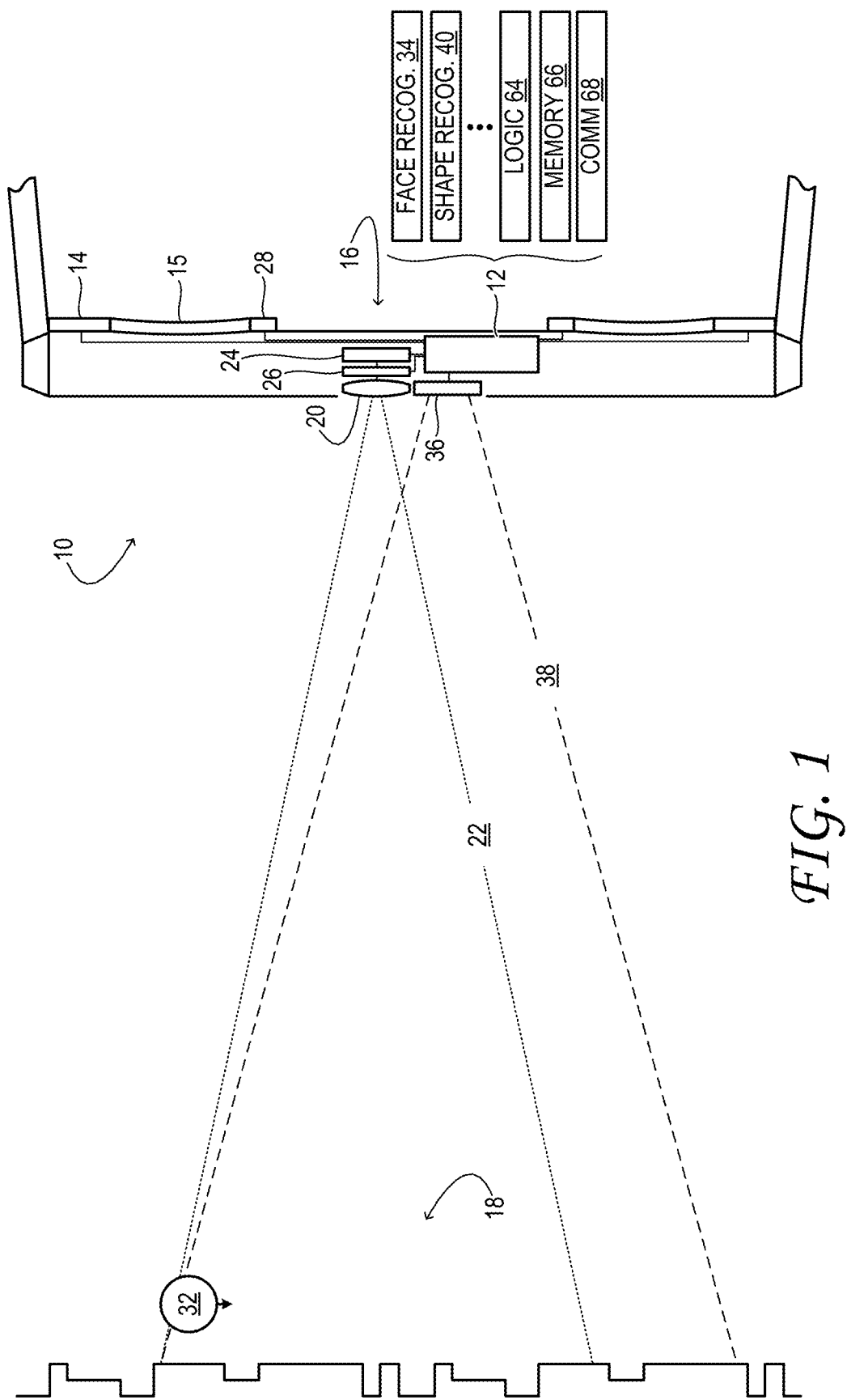
FIGS. 1 and 2 show aspects of an example imaging system in accordance with an embodiment of this disclosure.

FIG. 1 shows aspects of an example imaging system 10 in one, non-limiting example. The imaging system of FIG. 1 takes the form of a wearable, near-eye display system with continuous video-capture capability; it includes a controller 12 operatively coupled to right and left display elements 14. The controller sends appropriate drive signals to each display element to control the virtual display imagery formed therein. In one example, each display element includes a light-emitting diode (LED) backlight positioned behind a transmissive liquid-crystal display (LCD) array. Other display-element examples may include a reflective LCD array such as a liquid-crystal-on-silicon (LCOS) array. In still other examples, an active-matrix LED array or scanning laser beam may be used to provide the virtual display imagery. In the embodiment of FIG. 1, the right and left display elements are optically coupled each to a corresponding display window 15. Each display window may be configured with beam-turning and/or pupil expanding functionality, so that the virtual display images formed by display elements 15 are presented to the wearer's eyes.

Display windows 15 may be at least partially transparent. This feature allows the virtual imagery from display elements 14 to be combined with real imagery sighted through the display windows, to provide an 'augmented reality' (AR) experience for the wearer of imaging system 10. The wearer, herein, is more generally referred to as an 'operator' or 'user' of the imaging system.

Continuing in FIG. 1, video camera 16 may be configured to record any or all of the real imagery 18 sighted by the operator through display windows 15. The video camera includes an objective lens system 20 that collects light over a field of view (FOV) 22 and directs such light onto an imaging array 24. The imaging array of the video camera may be a high-speed, high-resolution red/green/blue (RGB) complementary metal oxide semiconductor (CMOS) array, in one example. In FIG. 1, the imaging array is operatively coupled to controller 12, which receives image data from the array. Positioned between the objective lens system and the imaging-array aperture is an electronically closable shutter 26. The shutter is configured to close in response to a closure signal from controller 12, thereby preventing video capture under specified conditions, and also providing a visual cue to bystanders that video capture is disabled.

Imaging system 10 may be configured to support various input modalities in order to receive operator input. For example, pushbuttons arranged on the frames of the imaging system may support manual input. Also, a microphone and associated speech-recognition logic in controller 12 may support voice recognition. Alternatively, or in addition, the imaging system may be configured to track the gaze direction of the operator, and to apply the gaze direction as a form of operator input. To this end, imaging system 10 of FIG. 1 includes right and left eye-imaging cameras 28. The eye-imaging cameras image the operator's eyes to resolve such features as the pupil centers, pupil outlines, or corneal glints created by off-axis illumination of the eyes. The positions of such features in the right and left eye images are provided as input parameters to a model, executed in controller 12, that computes gaze direction. Once the gaze direction is computed, it may be used as position data for interacting with a graphical user interface projected into a user's field of view and/or for receiving eye gesture inputs, for example. Further, in some examples, image data from the eye-imaging cameras may be used to assess eyelid opening and closure—e.g., to detect winking and blinking, which also may serve as forms of operator input.

As noted above, video camera 16 of imaging system 10 may be configured to automatically record the real imagery sighted the operator of the imaging system and located within the FOV of the video camera. This scenario is shown also in FIG. 2, where bystander 32 is present in FOV 22, and is sighted by operator 30. This disclosure is directed, in part, to safeguarding the privacy of the bystander, who may not want to be recorded.

With a traditional hand-held video camera, the mere act of holding the video camera and pointing it toward a subject broadcasts the operator's intent to capture video. A bystander, aware that the recording is taking place but unwilling to be recorded, may avoid the camera or at least signal unwillingness to the operator. However, when a video camera is not held in the operator's hand, but integrated in eyewear, clothing, or otherwise worn, a bystander may have no knowledge that he or she is being recorded and no opportunity to opt out of the recording. In addition, a bystander, discovering that he or she is a subject of on-going recording activity, may feel that his or her privacy has been violated.

To address this issue, imaging system 10 may be configured to record video only when it is determined that no bystanders are within FOV 22, except those who have confirmed their willingness to be recorded. Accordingly, controller 12 of FIG. 1 includes a face-recognition engine 34 configured to process the video stream acquired by video camera 16. The face-recognition engine may have access to one or more stored facial images (or other identifying information) of persons confirmed as willing to be recorded. If a bystander is encountered who is not confirmed as willing to be recorded, then video recording may be suspended until that person's willingness can be confirmed (vide infra).

Triggers of various kinds may be used to initiate video recording on startup of imaging system 10, or to resume video recording after it has been suspended, in a manner respectful of bystander privacy. For example, in some scenarios, it may be left to the operator to determine whether an unwilling bystander is present in FOV 22, and to initiate/resume recording when no such bystander is present. In other scenarios, a few frames of video may be captured provisionally and analyzed in face-recognition engine 34. If the face-recognition engine determines that the FOV includes no bystanders except those whose willingness has been confirmed, then continuous video capture may be enabled.

In other examples, dedicated hardware of imaging system 10 can be used to initiate/resume video recording without requiring explicit operator input or collection of even one frame of video. Continuing with FIG. 1, imaging system 10 may include a sensor 36, which is separate from video camera 16 but configured to acquire sensory data at least over the FOV 22 of the video camera. In the example shown in FIG. 1, sensor 36 has an FOV 38, which overlaps FOV 22. Controller 12 may be configured to parse sensory data from the sensor for evidence of a human being in FOV 22 and to enable recording of video with the video camera if no human being is detected in the FOV, based upon the sensory data.

The nature of sensor 36 may differ in various implementations of this disclosure. In one example, sensor 36 is a far-infrared (FIR) sensor—i.e., a non-contact temperature sensor. The FIR sensor may be responsive over a wavelength range of 1 to 10 micrometers, in some examples. Both imaging and non-imaging FIR sensors may be useful for detecting the presence of human beings. In one very basic example, a non-imaging (e.g., single pixel) FIR sensor may be used to determine whether any object in the video camera's FOV is above a threshold temperature—e.g., >30° C. at the surface of the object sighted by the sensor. Controller 12 may be configured to initiate or resume video recording only if no such object is present in the FOV. In some examples, high-pass filtering of the sensory signal may be used to distinguish a moving human being from a warm, stationary object, such as a lamp.

Figure 3:

In other examples, an imaging FIR sensor 36 be used to detect human beings based on thermal mapping. Accordingly, sensor 36 may be a MEMS-based thermopile-array sensor, for example. The sensor array may have a resolution and 'color' depth significantly lower than of video camera 16. Such a sensor may output a relatively low-resolution thermal image of the FOV of the video camera, as shown in FIG. 3. Controller 12 may be configured to analyze the thermal image to detect one or more human-like shapes and to initiate or resume video recording only if no human-like shape is present in the FOV. To this end, the controller may include a shape-recognition engine 40 (referring again to FIG. 1). Higher-resolution FIR image data, even if readily available, may not be desirable for at least two reasons. First, the compute power required to analyze an image increases as the square of the resolution, so using a lower resolution may help to conserve system resources. Second, it is possible that sufficiently high-resolution FIR image data may allow an unwilling bystander to be identified.

Figure 4:
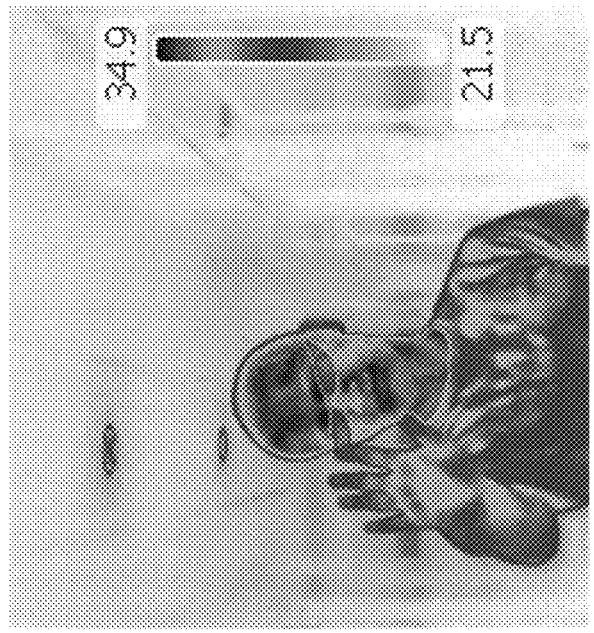
FIGS. 3 and 4 are example thermal maps of a bystander imaged with far-infrared (FIR) sensor.

Continuing with FIG. 1, sensor 36 in the form of an imaging FIR array may also be used to support gesture detection. For example, in one example scenario, a bystander, aware that video may be recorded in her proximity, may use a gesture to signal either willingness or unwillingness to be recorded. Examples include a 'thumbs-up' gesture to signal willingness, or, as illustrated in FIG. 4, a 'Let me be' gesture to signal unwillingness. Shape-recognition engine 40 may be configured to detect such gestures in a low-resolution thermal map or in other sensor data.

While this disclosure describes FIR-based sensory data for indicating the presence of a human being, and optionally detect gestures, it will be understood that other types of sensory data may be used instead of or in addition to FIR-based sensory data. Virtually any form of sensory data may be utilized as long as the data allows a bystander to be identified as a human being, but does not enable the bystander to be identified. As such, the sensory data may be chosen to provide below-threshold fidelity in imaging the subject and/or the environment in which the subject is located. Additional sensory modes adaptable for this purpose may include low-resolution visible or near-infrared imaging, low-resolution time-of-flight depth imaging, ultrasonic and millimeter-wave imaging, among others.

Although the foregoing drawings and description feature an imaging system in the form of a near-eye display system worn on the face of an operator, the solutions disclosed herein are equally applicable to video capture by devices worn around the neck, concealed in clothing or accessories (e.g., a hat), by cellular telephones, tablet computers, hand-held game systems, and other portable electronic devices. It is also envisaged that certain stationary video-capture systems may be adapted, as presently disclosed, to safeguard the privacy of bystanders. Machine vision in a gaming environment, for example, may be initiated only after it is determined that no unwilling bystanders (e.g., non-players) are present in the system's FOV. Machine vision may be paused, additionally, when an unrecognized bystander wanders into the FOV of the machine-vision system.

The configurations described above may enable various methods for video-recording to be enacted in an imaging system. Some such methods are now described with continued reference to the above configurations. It will be understood, however, that the methods here described, and others within the scope of this disclosure, also may be enabled by different configurations.

FIG. 5 illustrates an example method 42 to record video with a video camera while respecting bystander privacy. At 44, sensory data separate from the video is acquired. As noted above, the sensory data may include imaging or non-imaging FIR data, or virtually any type of data that enables a human being to be detected without being identified.

At 46, the sensory data is parsed for evidence of a bystander—i.e., a human being in the FOV of the video camera. The evidence of the human being may include a warm locus in the FOV, a warm moving locus, or, if a thermal image is available, a shape of above-threshold temperature corresponding to a head and body of a human being, as examples.

Figure 6:
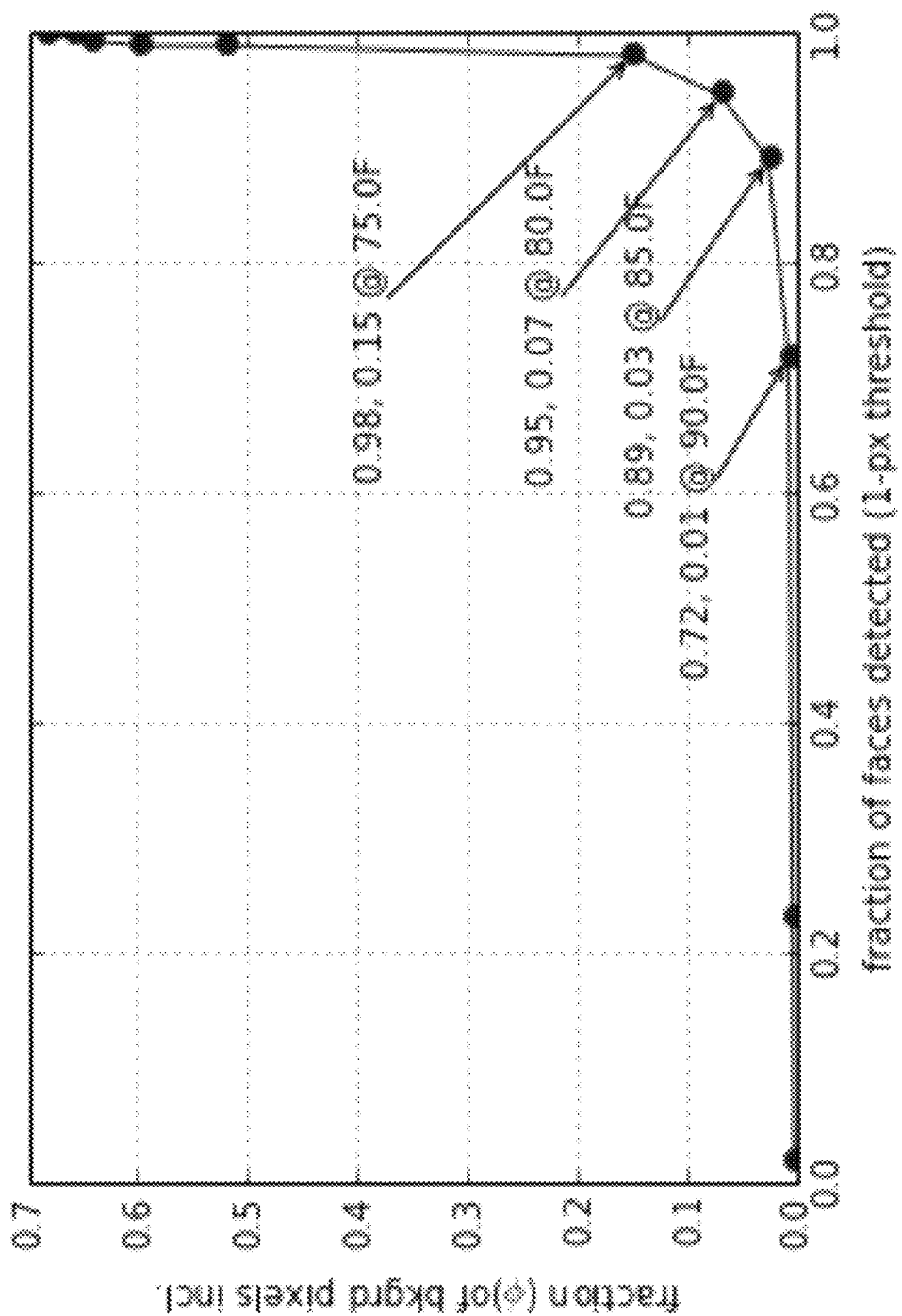
FIG. 6 is a plot representing a fraction of background pixels of an FIR image erroneously detected as belonging to a face, relative to a fraction of faces detected, in accordance with an embodiment of this disclosure.

FIG. 6 shows results of a simple experiment estimating the fraction of pixels from FIR footage collected over many thousands of frames in a warm outdoor temperature (24° C.), a cold outdoor temperature (11° C.), a cold indoor garage temperature (14° C.), an indoor office temperature (21° C.), and an indoor lobby temperature (19° C.) with people constantly coming in from cold outside settings. A single temperature threshold is chosen for these settings. The graph compares the fraction of faces for which at least one pixel is above that threshold (on the x axis) to the fraction of pixels falsely designated as faces (the y axis). At a threshold of 85° F., for instance, approximately 89% of faces are recognized while approximately 3% of non-face pixels are detected.

It will be understood that these data represent early results, and that further discrimination based on empirical temperature patterns for the face (as opposed to single-threshold rejection) may help to further suppress false positive detection. In the experiment described above, most of the 11% occurrence of failed face recognition occurred when the face was directed away from the video camera. When the face is directed towards the camera, higher detection rates are observed, missing perhaps 0.1% of face-to-face interactions, based on current analysis.

Another way to reduce the occurrence of false positives in human-shape detection may be to filter the selected foreground pixels (or a single pixel in a non-imaging sensor configuration) based on whether such pixels exhibit a temporal variation consistent with an underlying physiological process—e.g., breathing or heart beat. To this end, imaging sensory data may be subject to principal component analysis.

Returning now to FIG. 5, at 48 it is determined whether evidence (e.g. above a threshold amount) is found to indicate a bystander's presence. If so, the method advances to 50, where it is determined whether confirmation of the bystander's willingness to be recorded has been received. The bystander's willingness may be confirmed in any suitable manner. For instance, the bystander may signal or otherwise indicate to the operator of the imaging system that he or she is willing to be recorded. The operator, then, may provide touch input, vocal input, gaze-direction input, etc., to the imaging system, which indicates that the bystander is willing to be recorded. In other examples, the bystander's signal may be transmitted electronically, wirelessly, or in the form of a light pulse received by sensor 36 of imaging system 10. In still other examples, confirmation of the bystander's willingness may come in the form of a hand or body gesture—e.g., a thumbs-up gesture. This kind of gesture, detected via a thermal map or other low-resolution image data, may serve to confirm the bystander's willingness to be recorded.

In some embodiments, the act of confirming whether the bystander's willingness has been received may be non-invasive (or even unknown) to the bystander. In other embodiments, the bystander may be directly queried. To prevent repeated querying of the same unwilling bystander, a feature vector may be assembled from the sensory data for each bystander encountered, and stored in a database if the bystander is confirmed unwilling to be recorded. Direct querying of the bystander may then be omitted if the bystander's feature vector matches that of a stored, unwilling bystander. It will be noted that assembled feature vectors may be of sufficient fidelity to enable a positive match of a previously observed bystander, but of insufficient fidelity to enable the bystander to be identified.

If confirmation of the bystander's willingness is received, then, at 52, recording of the video is initiated. Conversely, in scenarios where the sensory data provides sufficient evidence of a human being in the FOV of the video camera, recording of the video is delayed until confirmation is received that the human being is willing to be recorded. Recording of video with the video camera may be initiated automatically if no human being is detected in the video camera's FOV, based on the sensory data.

Figure 2:
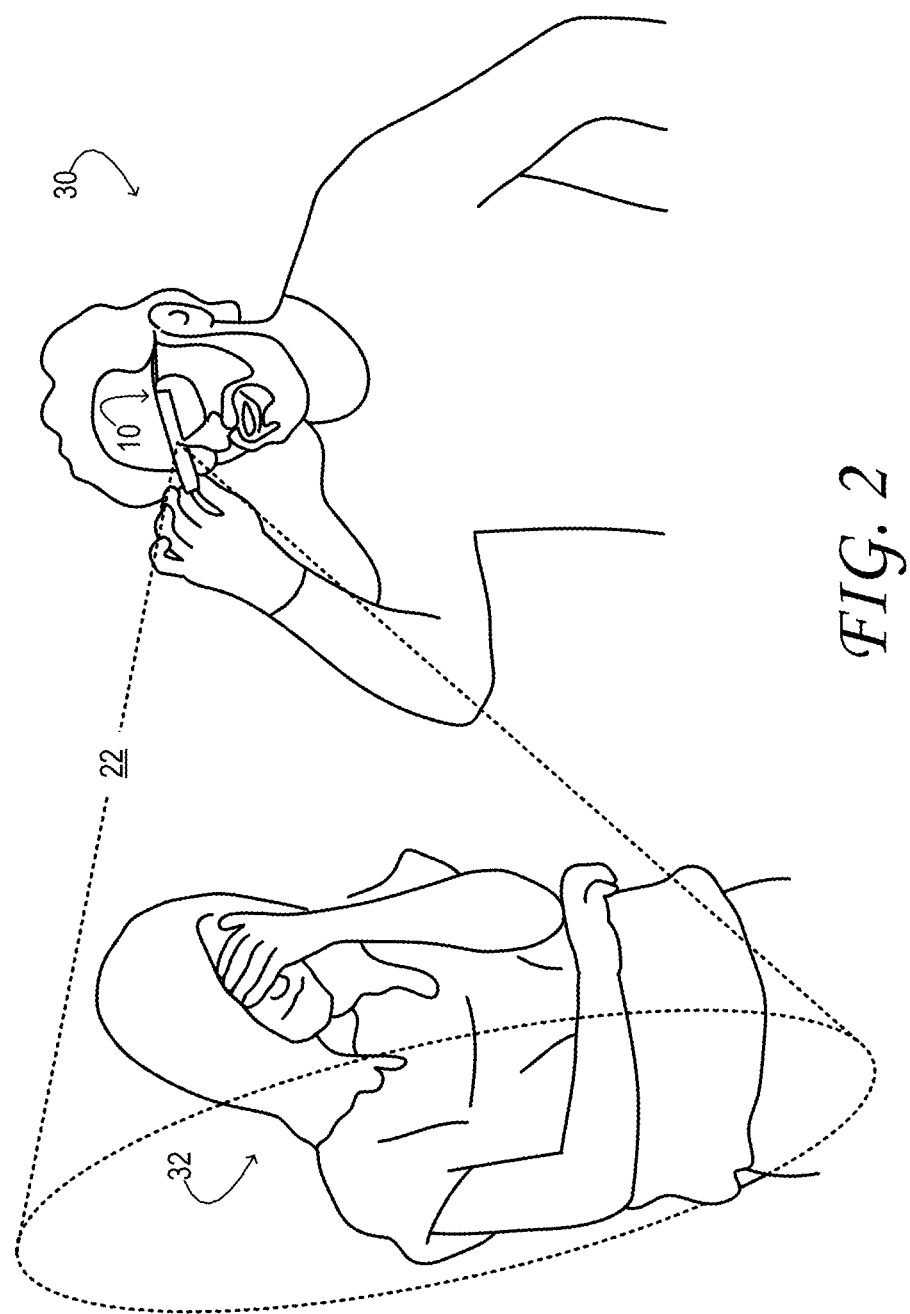

At 54 of method 42, the video is parsed in order to recognize one or more human beings. Then, at 56, it is determined whether the parsed video includes sufficient evidence (e.g., a face) of a bystander who is not already confirmed as willing to be recorded. This act may require the storing of one or more images of persons confirmed as willing to be recorded, for comparison against the real-time video. If the video contains sufficient evidence of a bystander not confirmed as willing to be recorded, then, at 58, the recoding of the video is suspended. Otherwise, the method advances to 60 and 61, where the video and sensory data (optionally) is parsed for a hand or body gesture indicating unwillingness of the bystander to be recorded. A gesture of this kind may also be used by a bystander to opt out of video recording, even if willingness to be recorded was previously signaled. The gesture may include a hand over a face of the bystander (as shown in FIG. 2), an alternative 'Let me be' gesture (as shown in FIG. 4), or virtually any other gesture identifiable in the video and/or sensory data. If, at 62, a gesture indicating unwillingness is recognized, then the method advances to 58, where video recording is suspended.

In some examples, video recording may be suspended in software—e.g., by not acquiring image frames via the video camera. In other examples, a more positive act may be taken to suspend recording of the video. For example, the appropriate gate bias may be removed from the imaging array of the video camera, which prevents any image from being formed. In other examples, a physical shutter arranged over the camera aperture may be closed to prevent exposure of the array to real imagery. An advantage of the latter approach is that it broadcasts to the wary bystander that video capture has been disabled. In some examples, the act of suspending video recording may be accompanied by flushing one or more of the most recent frames of already-acquired video from the memory of controller 12, to further protect the bystander's privacy.

After video recording is suspended, execution of method 42 returns to 44, where additional sensory data is acquired. Next, it is again determined whether a threshold amount of sensory evidence of a human being exists in the FOV, and if so, whether that human being is bystander who may be willing to be recorded. Recording of the video may be resumed when it is confirmed that the bystander is willing to be recorded.

As evident from the foregoing description, the methods and processes described herein may be tied to a compute system of one or more computing machines—e.g., controller 12 of FIG. 1. Such methods and processes may be implemented as a hardware driver program or service, an application-programming interface (API), a library, and/or other computer-program product. Each computing machine includes a logic machine 64, an associated computer-memory machine 66, and a communication machine 68.

Each logic machine includes one or more physical logic devices configured to execute instructions. A logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

A logic machine may include one or more processors configured to execute software instructions. Additionally or alternatively, a logic machine may include one or more hardware or firmware logic machines configured to execute hardware or firmware instructions. Processors of a logic machine may be single-core or multi-core, and the instructions executed thereon may be configured for sequential, parallel, and/or distributed processing. Individual components of a logic machine optionally may be distributed among two or more separate devices, which may be remotely located and/or configured for coordinated processing. Aspects of a logic machine may be virtualized and executed by remotely accessible, networked computing devices configured in a cloud-computing configuration.

Each computer-memory machine includes one or more physical, computer-memory devices configured to hold instructions executable by an associated logic machine to implement the methods and processes described herein. When such methods and processes are implemented, the state of the computer-memory machine may be transformed—e.g., to hold different data. A computer-memory machine may include removable and/or built-in devices; it may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. A computer-memory machine may include volatile, nonvolatile, dynamic, static, read/write, read-only, random-access, sequential-access, location-addressable, file-addressable, and/or content-addressable devices.

It will be appreciated that a computer-memory machine includes one or more physical devices. However, aspects of the instructions described herein alternatively may be propagated by a communication medium (e.g., an electromagnetic signal, an optical signal, etc.), as opposed to being stored via a storage medium.

Aspects of a logic machine and associated computer-memory machine may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms program' and 'engine' may be used to describe an aspect of a computer system implemented to perform a particular function. In some cases, a program or engine may be instantiated via a logic machine executing instructions held by a computer-memory machine. It will be understood that different programs and engines may be instantiated from the same application, service, code block, object, library, routine, API, function, etc. Likewise, the same module, program, or engine may be instantiated by different applications, services, code blocks, objects, routines, APIs, functions, etc. A module, program, or engine may encompass individual or groups of executable files, data files, libraries, drivers, scripts, database records, etc.

A communication machine may be configured to communicatively couple the compute system to one or more other machines, including server computer systems. The communication machine may include wired and/or wireless communication devices compatible with one or more different communication protocols. As non-limiting examples, a communication machine may be configured for communication via a wireless telephone network, or a wired or wireless local- or wide-area network. In some examples, a communication machine may allow a computing machine to send and/or receive messages to and/or from other devices via a network such as the Internet.

It will be understood that the configurations and/or approaches described herein are exemplary in nature, and that these specific examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

Another example provides a method to record video with a video camera while respecting bystander privacy. The method comprises acquiring thermal sensory data separate from the video, parsing the thermal sensory data for evidence of a human being in a field of view of the video camera, and recording video with the video camera if no human being is detected in the field of view based on the thermal sensory data.

In some implementations, the above method may additionally or alternatively comprises, if a human being is detected in the field of view based upon the thermal sensory data, delaying recording of the video until confirmation is received that the human being is willing to be recorded. In some implementations, the above method may additionally or alternatively comprise parsing the video to recognize one or more human beings. In some implementations, the above method may additionally or alternatively comprise suspending recording of the video on recognizing a human being not confirmed as willing to be recorded. In some implementations, the above method may additionally or alternatively comprise resuming recording of the video when it is confirmed that the human being is willing to be recorded. In some implementations, the above method may additionally or alternatively comprise parsing the video to recognize a hand or body gesture of a human being. In some implementations, the above method may additionally or alternatively comprise suspending recording of the video on recognizing a hand or body gesture indicating unwillingness to be recorded. In some implementations, the above method may additionally or alternatively comprise parsing the thermal sensory data to recognize a hand or body gesture of a human being indicating willingness to be recorded, and resuming recording of the video on recognizing the hand or body gesture.

Another example provides an imaging system comprising a video camera; separate from the video camera, a sensor configured to acquire sensory data over a field of view of the video camera; and a controller configured to parse the sensory data for evidence of a human being in the field of view of the video camera and to enable recording of video with the video camera if no human being is detected in the field of view based upon the sensory data.

In some implementations, the sensor of the above imaging system may additionally or alternatively comprise a far-infrared sensor. In some implementations, the sensor may additionally or alternatively comprise a thermopile array sensor. In some implementations, the sensor may additionally or alternatively comprise an imaging sensor of lower resolution and/or color depth than the video camera. In Some implementations of the above imaging system may additionally or alternatively comprise an electronically closable shutter arranged over an aperture of the video camera, wherein the controller is configured to keep the shutter closed when recording of the video is not enabled. In some implementations, the above imaging system is wearable and/or configured for continuous video acquisition.

Another aspect of this disclosure is directed to another method to record video with a video camera while respecting bystander privacy. This method comprises acts of: acquiring far-infrared sensory data separate from the video; parsing the far-infrared sensory data for evidence of a human being in a field of view of the video camera; if no human being is detected in the field of view based upon the far-infrared sensory data, recording video with the video camera; if a human being is detected in the field of view based upon the far-infrared sensory data, delaying recording of the video until confirmation is received that the detected human being is willing to be recorded; parsing the video to recognize a human being; suspending recording of the video on determining that a recognized human being is not confirmed as willing to be recorded; parsing the video to recognize a gesture of a human being indicating unwillingness to be recorded; and suspending recording of the video on recognizing the gesture.

In some implementations, the above method may additionally or alternatively comprise storing one or more images of human beings confirmed as willing to be recorded. In some implementations, the evidence of the human being may additionally or alternatively include a far-infrared image corresponding to a head and body shape of a human being. In some implementations, the gesture indicating unwillingness may additionally or alternatively include a hand over a face of the human being. Some implementations of the above method may additionally or alternatively comprise parsing the far-infrared sensory data to recognize a gesture of one or more human beings indicating willingness to be recorded, and resuming recording of the video on recognizing the gesture indicating willingness to be recorded.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method to record video with a video camera while respecting bystander privacy, the method comprising:
capturing video with the video camera;
acquiring thermal sensory data separate from the video;
parsing the thermal sensory data for evidence of a human being first entering a field of view of the video camera; and
based on detecting a human being first entering the field of view via the thermal sensory data while the video is being captured, suspending recording of the video until confirmation is received that the human being is willing to be recorded.

2. The method of claim 1, further comprising, when a human being is detected in the field of view via the thermal sensory data, delaying recording of the video until confirmation is received that the human being is willing to be recorded.

3. The method of claim 1, further comprising parsing the video to recognize one or more human beings and suspending recording of the video when a human being of the one or more human beings is not confirmed as willing to be recorded.

4. The method of claim 3, further comprising resuming recording of the video when it is confirmed that the human being is willing to be recorded.

5. The method of claim 4, further comprising parsing the thermal sensory data to recognize a hand or body gesture of a human being indicating willingness to be recorded, and resuming recording of the video on recognizing the hand or body gesture.

6. The method of claim 1, further comprising parsing the video to recognize a hand or body gesture of a human being.

7. The method of claim 6, further comprising suspending recording of the video on recognizing a hand or body gesture indicating unwillingness to be recorded.

8. The method of claim 7, wherein the gesture indicating unwillingness includes a hand over a face of the human being.

9. An imaging system comprising:
a video camera;
separate from the video camera, a sensor configured to acquire thermal sensory data over a field of view of the video camera; and
a controller configured to capture video with the video camera, parse the thermal sensory data for evidence of a human being first entering the field of view of the video camera, and based on detecting a human being first entering the field of view via the thermal sensory data while the video is being captured, to suspend recording of the video until confirmation is received that the human being is willing to be recorded.

10. The imaging system of claim 9, wherein the sensor is a far-infrared sensor.

11. The imaging system of claim 9, wherein the sensor is an imaging sensor of lower resolution and/or color depth than the video camera.

12. The imaging system of claim 9, further comprising an electronically closable shutter arranged over an aperture of the video camera, wherein the controller is configured to keep the shutter closed when recording of the video is not enabled.

13. The imaging system of claim 9, wherein the imaging system is wearable.

14. The imaging system of claim 9, wherein the imaging system is configured for continuous video acquisition.

15. A method to record video with a video camera while respecting bystander privacy, the method comprising:
acquiring far-infrared sensory data separate from the video;

parsing the far-infrared sensory data for evidence of a human being first entering a field of view of the video camera;

if no human being is detected in the field of view via the far-infrared sensory data, then recording video with the video camera without delay;

if a human being is detected in the field of view via the far-infrared sensory data, then delaying recording of the video until confirmation is received that the detected human being is willing to be recorded; and based on detecting a human being first entering the field of view via the far-infrared sensory data while the video is being captured, suspending recording of the video until confirmation is received that the human being is willing to be recorded.

16. The method of claim 15, further comprising storing one or more images of human beings confirmed as willing to be recorded.

17. The method of claim 15, wherein the evidence of the human being includes a far-infrared image corresponding to a head and body shape of a human being.

18. The method of claim 15, further comprising parsing the far-infrared sensory data to recognize a gesture of one or more human beings indicating willingness to be recorded, and resuming recording of the video on recognizing the gesture indicating willingness to be recorded.

19. The method of claim 15, further comprising parsing the video to recognize a human being, and suspending recording of the video on determining that a recognized human being is not confirmed as willing to be recorded.

20. The method of claim 15, further comprising parsing the video to recognize a gesture of a human being indicating unwillingness to be recorded, and suspending recording of the video on recognizing the gesture.

* * * * *